May 29, 1956      R. B. RALLS      2,747,926
ANTI-GLARE ATTACHMENT FOR MOTOR VEHICLES
Filed Aug. 12, 1953      2 Sheets-Sheet 1
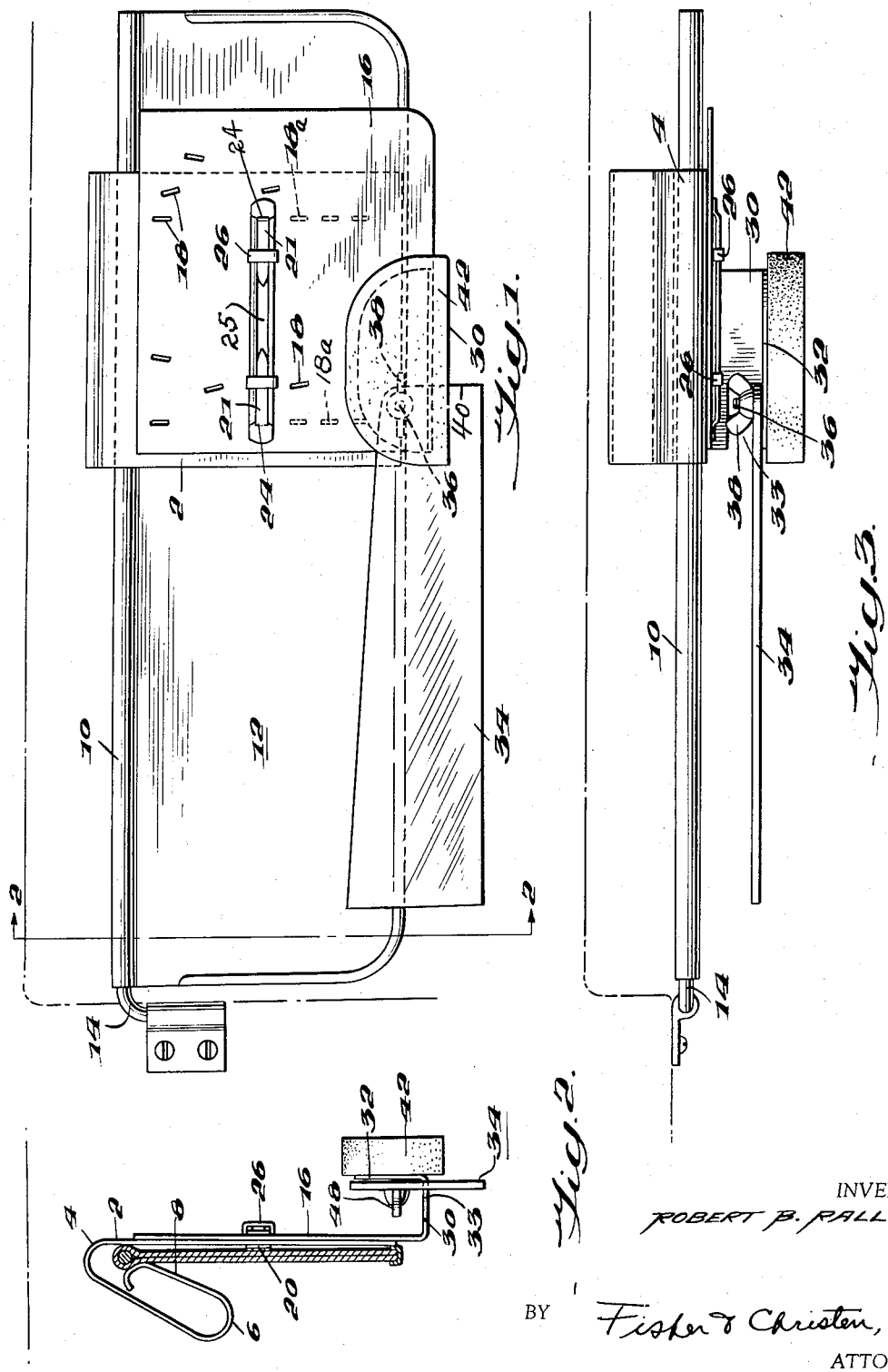
INVENTOR
ROBERT B. RALLS
BY *Fisher & Christen,*
ATTORNEYS May 29, 1956 R. B. RALLS 2,747,926
ANTI-GLARE ATTACHMENT FOR MOTOR VEHICLES
Filed Aug. 12, 1953 2 Sheets-Sheet 2
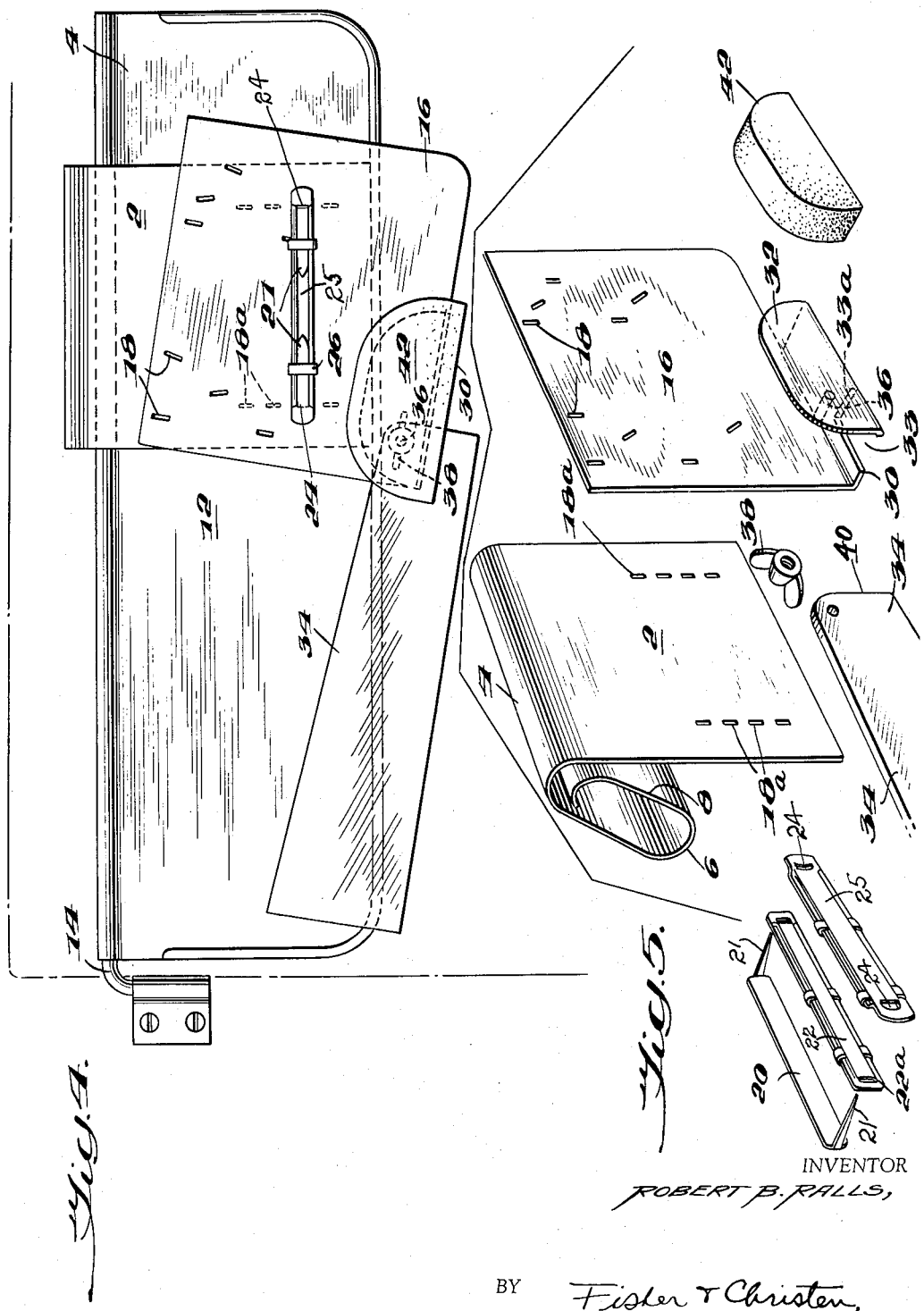
INVENTOR
ROBERT B. RALLS,
BY Fisher & Christen,
ATTORNEYS

United States Patent Office 2,747,926
Patented May 29, 1956

2,747,926

ANTI-GLARE ATTACHMENT FOR MOTOR VEHICLES

Robert B. Ralls, Tucson, Ariz.

Application August 12, 1953, Serial No. 373,715

4 Claims. (Cl. 296—97)

This invention relates to an anti-glare device for ready attachment to a standard sun visor found in motor vehicles.

The principal object of the invention is to provide a device of simple and inexpensive construction for use in screening the objectionable glare of the headlights of approaching cars from the eyes of the driver.

More specifically, this invention is a detachable anti-glare device which may easily be adjusted to suit the individual driver in a plurality of positions, both vertically and angularly, and which does not require additional attaching means or perforations of any kind in the standard motor vehicle visor.

The anti-glare device of the present invention may be laterally positioned at the proper place on the sun visor to suit the convenience of the driver; the device comprises two overlapping plates which may be positioned in different vertical and angular positions with relation to each other; one of these plates carries near its lower edge a translucent shield which is itself angularly positionable on a horizontal axis. These various adjustments enable the driver to position the translucent shield in exactly the right place to screen the glare from the headlights of approaching cars.

The translucent shield may be swung upwardly when not in use, and the entire device may also be swung upwardly with the visor when not in use, as in the daytime, and may also be readily removed entirely from the visor, if desired.

The translucent shield is preferably of a shape, and so positioned, as to screen the glare of approaching headlights, while leaving the driver a clear view of his side of the road, which is especially important in night driving.

Other objects and advantages will be described in connection with the following description and drawings, wherein:

Fig. 1 is a front view of the device in place on a standard sun visor.

Fig. 2 is a sectional view on line 2—2 of Fig. 1.

Fig. 3 is a top view of Fig. 1.

Fig. 4 illustrates the invention in one of the angularly adjusted positions.

Fig. 5 is a disassembled view, showing the various elements comprising the present invention.

The device comprises a plate 2, preferably sheet metal, having a reverse bend 4 at the top and being extended into another bend 6, terminating in a contact face 8, to form a spring clamp. This clamp is adapted to engage over the top edge 10 of a standard sun visor 12, which can be swung upwardly about its mounting rod 14.

Cooperating with plate 2 is a second plate 16, which partially overlaps plate 2. The plates 2 and 16 are provided with a plurality of perforations 18 and 18a positioned at various levels vertically and at various points laterally of the plates. These various perforations 18 and 18a are adapted to be brought into registry in various combinations, and a fastening device, preferably two-pronged, is provided for securing the plates to each other in various adjusted positions, vertically and angularly. Thus the cooperating plates 2 and 16 are adjustable to fit all visors of varying vertical widths by registering any desired pair of perforations 18 in plate 16 with the perforations 18a in plate 2.

One type of two-pronged fastening device that may be used is a known type, comprising a back plate 20, having a flexible tongue or prong 21 at each end, spaced apart a distance corresponding to various pairs of holes 18 and 18a. The prongs 21 of plate 20 are passed through holes 22a in a plate 22, which plate 22 bears against the back of plate 2. The smooth face of back plate 20 assures that the visor will not be damaged by positioning and sliding the entire device horizontally thereon. The purpose of plate 22 is to protect and steady the prongs 21. The prongs 21 are then passed through a registering pair of holes 18a in plate 2, and then through a corresponding pair of holes 18 in plate 16, depending on the height and angular position desired for plate 16. The prongs are then passed through holes 24 in a keeper plate 25 and folded inwardly and held by sliders 26.

The two plates 2 and 16 may be positioned at various levels and in various angular positions with respect to each other by selecting an appropriate pair of holes 18 and 18a for passage therethrough of prongs 21.

Plate 16, at its lower edge, is provided with a forwardly extending bracket 30 having a front face 32. The left hand horizontal portion of bracket 30 is cut out, as at 33, to provide a stop shoulder 33a.

An anti-glare screen 34 of translucent or transparent glass or plastic material is pivoted to bracket 30 on a pivot pin 36 threaded to receive a wing nut 38, so that the screen 34 may be swung to any desired position and held in place by the wing nut 38. The translucent screen 34, when pivoted on pin 36, has its right end extending into cutout 33 in bracket 30, the right hand edge 40 of the screen, when in downwardly extended position, bearing against stop shoulder 33a of the bracket, thereby positioning the screen in operative position, as in Fig. 4. The screen may be swung about 180° clockwise, about its pivot, so that an adjacent edge, around the corner from 40, rests on portion 30, thereby positioning the screen in inoperative position. Referring to Fig. 3, it will be noted that screen 34 is spaced from the sun visor, thereby avoiding any scratching or marring contact of the screen with the visor as it is swung about its pivot. As is evident from Figs. 2 and 3, the anti-glare screen 34 is spaced inwardly, out of contact with either the sun visor 12 or the windshield of the car, a valuable feature in that the screen 34 cannot scratch either the sun visor or windshield as it is swung up and down about its pivot 36.

The front 32 of the bracket is preferably provided with a cushion 42 of sponge rubber or the like, so that the driver will not bump his head on the bracket.

In use, the device is snapped over the sun visor and held in place thereon by the clamping face 8 of plate 2. In this position, the device may readily be moved back and forth for lateral positioning on the sun visor. The two overlapping plates 2 and 16 may be positioned or in various vertical and angular positions with respect to each other, as shown in Figs. 1 and 4, by selecting an appropriate pair of holes 18 and 18a for the fastener 21, 22. The translucent screen may be set and held in any desired angular position by the wing nut 38.

The device may therefore be positioned readily in the exact position to suit the convenience of the driver, to screen the glare of approaching headlights and to leave the right-hand side of the road clear. The screen 34 may be swung to a vertical or inoperative position whenever desired, and the entire device swung upwardly with the sun visor about the visor rod 14 when the device is not in use. The device may readily be removed from one car to another and attached to the sun visor of another car without any extraneous fastening devices and without harming the sun visor and is readily adjustable to fit visors of varying vertical widths.

While the invention has been described in some detail, it should be understood that the device is not limited to the exact details shown, but may be carried out in other ways.

I claim as my invention:

1. An anti-glare device for motor vehicles, comprising a base plate, means for detachably securing said plate to the sun visor of a motor vehicle, said plate being provided at its lower edge with a forwardly and horizontally extending bracket terminating in an upwardly extending front portion spaced from said plate, said bracket being provided with a horizontally extending stop shoulder on the lower portion thereof, a translucent anti-glare screen having adjacent edges and pivoted at one corner thereof near the intersection of said adjacent edges, to said upwardly extending front portion, above said stop shoulder, whereby when said screen is swung about its pivot, one of said edges engages against said stop shoulder for positioning the screen in operative position and whereby when the screen is swung in the opposite direction about its pivot the other adjacent edge rests on said bracket for holding it in inoperative position.

2. The combination of claim 1, wherein said anti-glare screen is positioned close to upwardly extending front portion of said bracket, whereby the screen is spaced away from said sun visor, to avoid contacting the visor as the screen is moved about its pivot.

3. The combination of claim 1, wherein the means for detachably securing said base plate to the sun visor includes a second plate detachably secured to said base plate, said second plate being provided with a reversely curved top portion adapted to detachably engage over the upper edge of the sun visor.

4. The combination of claim 3, wherein said base plate and second plate are provided with registering apertures and with fastening elements engageable through said apertures, for variably positioning said plates with respect to each other.

References Cited in the file of this patent

UNITED STATES PATENTS

| | | |
|---|---|---|
| 1,567,480 | Wood | Dec. 29, 1925 |
| 1,571,097 | Redman | Jan. 26, 1926 |
| 1,607,829 | Johnson | Nov. 23, 1926 |
| 1,617,981 | Allen | Feb. 15, 1927 |
| 1,707,227 | Kline | Apr. 2, 1929 |
| 1,922,295 | Hunter | Aug. 15, 1933 |
| 2,112,726 | Kemp et al. | Mar. 29, 1938 |
| 2,231,641 | Schwab | Feb. 11, 1941 |
| 2,336,061 | Brennan | Dec. 7, 1943 |
| 2,560,009 | Straith | July 10, 1951 |
| 2,603,530 | Jones | July 15, 1952 |
| 2,638,903 | Janovsky et al. | May 19, 1953 |
| 2,665,939 | Lurie | Jan. 12, 1954 |

FOREIGN PATENTS

| | | |
|---|---|---|
| 254,167 | Great Britain | July 1, 1926 |
| 362,986 | Great Britain | Dec. 14, 1931 |